(12) United States Patent
Kalkanoglu et al.

(10) Patent No.: US 8,997,427 B2
(45) Date of Patent: Apr. 7, 2015

(54) SYSTEM, METHOD AND APPARATUS FOR INCREASING AVERAGE REFLECTANCE OF A ROOFING PRODUCT FOR SLOPED ROOF

(71) Applicant: CertainTeed Corporation, Valley Forge, PA (US)

(72) Inventors: Husnu M. Kalkanoglu, Swarthmore, PA (US); Gregory F. Jacobs, Oreland, PA (US); Richard A. Snyder, Eagleville, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 14/162,160

(22) Filed: Jan. 23, 2014

(65) Prior Publication Data

US 2014/0134400 A1    May 15, 2014

Related U.S. Application Data

(63) Continuation of application No. 13/558,069, filed on Jul. 25, 2012, now Pat. No. 8,673,427.

(60) Provisional application No. 61/525,003, filed on Aug. 18, 2011.

(51) Int. Cl.
*E04D 1/22*     (2006.01)
*E04D 1/28*     (2006.01)
(Continued)

(52) U.S. Cl.
CPC ...... *E04D 13/16* (2013.01); *E04D 1/20* (2013.01); *B05D 5/061* (2013.01); *B05D 5/065* (2013.01); *E04D 2001/005* (2013.01); *Y02B 10/20* (2013.01); *Y02B 80/34* (2013.01)

(58) Field of Classification Search
USPC .......... 52/518; 428/40.1, 212, 142, 402, 403, 428/404, 405, 406, 407, 141; 106/493; 427/214, 212
See application file for complete search history.

(56) References Cited

U.S. PATENT DOCUMENTS 1,943,525 A   1/1934  Gundlach
2,009,617 A   7/1935  Harshberger
(Continued)

FOREIGN PATENT DOCUMENTS

EP   0003302 B1   7/1981
GB   1214816      12/1970
(Continued)

OTHER PUBLICATIONS

BASF Aktiengesellschaft, "Product Specification, SIXOLUX Metal Gloss L 6015," 1 pg., Sep. 18, 2002.
(Continued)

*Primary Examiner* — Chi Q Nguyen
(74) *Attorney, Agent, or Firm* — Alexander H. Plache; Abel Law Group, LLP

(57) ABSTRACT

A roofing product includes coating a substrate with bitumen to yield a bitumen coated substrate having an exposure zone. First granules are adhered to the exposure zone to yield a first granule coating. The first granules have a solar reflectance greater than 35. An adhesive is adhered to at least a portion of the first granule coating. An open portion of the first granule coating that is free of the adhesive is maintained. An overlay of non-white second granules is adhered to the adhesive, such that the overlay of second granules and the adhesive provide a raised structure above a plane of the first granule coating.

24 Claims, 14 Drawing Sheets

(51) Int. Cl.
*E04D 13/16* (2006.01)
*E04D 1/20* (2006.01)
*B05D 5/06* (2006.01)
*E04D 1/00* (2006.01)

(56) References Cited

U.S. PATENT DOCUMENTS

| | | | |
|---|---|---|---|
| 2,057,678 A | 10/1936 | Gundlach | |
| 2,057,679 A | 10/1936 | Gundlach | |
| 2,133,728 A | 10/1938 | Teetor | |
| 2,378,927 A | 6/1945 | Clifford | |
| 2,379,358 A | 6/1945 | Clifford | |
| 2,507,677 A | 5/1950 | Packer et al. | |
| 2,591,149 A | 4/1952 | Grove | |
| 2,614,051 A | 10/1952 | Buzzell et al. | |
| 2,625,930 A | 1/1953 | Harris | |
| 2,695,851 A | 11/1954 | Lodge | |
| 2,732,311 A | 1/1956 | Hartwright | |
| 2,898,232 A | 8/1959 | Miller et al. | |
| 2,927,045 A | 3/1960 | Lodge et al. | |
| 2,963,378 A | 12/1960 | Palmquist et al. | |
| 2,981,636 A | 4/1961 | Lodge et al. | |
| 2,986,476 A | 5/1961 | Larssen | |
| 3,001,331 A | 9/1961 | Brunton | |
| 3,255,031 A | 6/1966 | Lodge et al. | |
| 3,945,945 A | 3/1976 | Kiovsky et al. | |
| 4,217,742 A | 8/1980 | Evans | |
| 4,378,408 A | 3/1983 | Joedicke | |
| 4,504,402 A | 3/1985 | Chen et al. | |
| 4,583,486 A | 4/1986 | Miller | |
| 4,675,140 A | 6/1987 | Sparks et al. | |
| 4,708,812 A | 11/1987 | Hatfield | |
| 4,717,614 A | 1/1988 | Bondoc et al. | |
| 4,916,014 A | 4/1990 | Weber et al. | |
| 5,000,999 A | 3/1991 | Hollander | |
| 5,240,760 A | 8/1993 | George et al. | |
| 5,347,785 A | 9/1994 | Terrenzio et al. | |
| 5,484,477 A | 1/1996 | George et al. | |
| 5,511,537 A | 4/1996 | Hively | |
| 5,514,350 A | 5/1996 | Kear et al. | |
| 5,595,813 A | 1/1997 | Ogawa et al. | |
| 5,616,532 A | 4/1997 | Heller et al. | |
| 5,783,506 A | 7/1998 | Eppler et al. | |
| 5,795,389 A * | 8/1998 | Koschitzky | 118/308 |
| 5,840,111 A | 11/1998 | Wiederhoeft et al. | |
| 5,876,683 A | 3/1999 | Glumac et al. | |
| 5,928,761 A | 7/1999 | Hedblom et al. | |
| 5,962,143 A | 10/1999 | Krauthaeuser et al. | |
| 6,037,289 A | 3/2000 | Chopin et al. | |
| 6,174,360 B1 | 1/2001 | Sliwinski et al. | |
| 6,245,850 B1 | 6/2001 | Fields | |
| 6,362,121 B1 | 3/2002 | Chopin et al. | |
| 6,366,397 B1 | 4/2002 | Genjima et al. | |
| 6,376,075 B1 | 4/2002 | Tacke-Willemsen et al. | |
| 6,446,402 B1 | 9/2002 | Byker et al. | |
| 6,454,848 B2 | 9/2002 | Sliwinski et al. | |
| 6,465,088 B1 | 10/2002 | Talpaert et al. | |
| 6,500,555 B1 | 12/2002 | Khaldi | |
| 6,521,038 B2 | 2/2003 | Yanagimoto et al. | |
| 6,533,961 B2 | 3/2003 | Harelstad et al. | |
| 6,548,145 B2 | 4/2003 | Joedicke | |
| 6,569,520 B1 | 5/2003 | Jacobs | |
| 6,596,070 B1 | 7/2003 | Schmidt et al. | |
| 6,599,355 B1 | 7/2003 | Schmidt et al. | |
| 6,607,781 B2 | 8/2003 | Joedicke | |
| 6,610,135 B1 | 8/2003 | Ohmori et al. | |
| 6,610,147 B2 * | 8/2003 | Aschenbeck | 118/308 |
| 6,647,688 B1 | 11/2003 | Gaitan et al. | |
| 6,653,356 B2 | 11/2003 | Sherman | |
| 6,680,134 B2 | 1/2004 | Maurer et al. | |
| 6,692,824 B2 | 2/2004 | Benz et al. | |
| 6,703,127 B2 | 3/2004 | Davis et al. | |
| 6,872,240 B2 | 3/2005 | Pellegrin | |
| 6,881,701 B2 | 4/2005 | Jacobs | |
| 6,933,007 B2 | 8/2005 | Fensel et al. | |
| 7,070,843 B2 | 7/2006 | Bartek et al. | |
| 7,070,844 B2 | 7/2006 | Bartek | |
| 7,238,408 B2 | 7/2007 | Aschenbeck et al. | |
| 7,241,500 B2 | 7/2007 | Shiao et al. | |
| 7,335,419 B2 | 2/2008 | Azari et al. | |
| 7,422,989 B2 | 9/2008 | Kalkanoglu et al. | |
| 7,452,598 B2 | 11/2008 | Shiao et al. | |
| 7,455,899 B2 | 11/2008 | Gross et al. | |
| 7,592,066 B2 | 9/2009 | Shiao et al. | |
| 7,595,107 B2 | 9/2009 | Kalkanoglu et al. | |
| 7,648,755 B2 | 1/2010 | Gross et al. | |
| 7,911,630 B2 | 3/2011 | Matsueda | |
| 7,919,170 B2 | 4/2011 | Gross et al. | |
| 7,971,406 B2 | 7/2011 | Kalkanoglu | |
| 8,206,807 B2 | 6/2012 | Friedman et al. | |
| 8,453,408 B2 | 6/2013 | Kalkanoglu et al. | |
| 8,586,856 B2 * | 11/2013 | Kalkanoglu et al. | 136/244 |
| 8,673,427 B2 * | 3/2014 | Kalkanoglu et al. | 428/143 |
| 8,795,426 B2 * | 8/2014 | Hunt | 106/284.3 |
| 2002/0092596 A1 * | 7/2002 | Phillips et al. | 156/64 |
| 2002/0160151 A1 | 10/2002 | Pinault et al. | |
| 2003/0035972 A1 | 2/2003 | Hanson et al. | |
| 2003/0068469 A1 * | 4/2003 | Aschenbeck et al. | 428/150 |
| 2003/0091795 A1 | 5/2003 | Kiik et al. | |
| 2003/0091814 A1 | 5/2003 | Benz et al. | |
| 2003/0152747 A1 | 8/2003 | Fensel et al. | |
| 2005/0053745 A1 | 3/2005 | Bartek et al. | |
| 2005/0053746 A1 | 3/2005 | Bartek | |
| 2005/0064197 A1 | 3/2005 | Nishii et al. | |
| 2005/0069707 A1 | 3/2005 | Tysoe et al. | |
| 2005/0072110 A1 | 4/2005 | Shiao et al. | |
| 2005/0072114 A1 | 4/2005 | Shiao et al. | |
| 2005/0126441 A1 | 6/2005 | Skelhorn | |
| 2006/0099397 A1 | 5/2006 | Thierauf et al. | |
| 2006/0251807 A1 | 11/2006 | Hong et al. | |
| 2007/0065640 A1 | 3/2007 | Joedicke | |
| 2007/0065641 A1 | 3/2007 | Joedicke | |
| 2008/0008832 A1 | 1/2008 | Shiao et al. | |
| 2008/0008858 A1 | 1/2008 | Hong et al. | |
| 2009/0117329 A1 | 5/2009 | Leitch et al. | |
| 2011/0000152 A1 | 1/2011 | Botke | |
| 2011/0027533 A1 | 2/2011 | Kennedy et al. | |
| 2011/0052874 A1 | 3/2011 | Zhou et al. | |
| 2011/0183112 A1 | 7/2011 | Bailey et al. | |
| 2011/0223385 A1 | 9/2011 | Shiao et al. | |

FOREIGN PATENT DOCUMENTS

| | | | |
|---|---|---|---|
| JP | 61176501 A | 8/1986 | |
| JP | 2004162482 | 6/2004 | |
| WO | 0011949 A1 | 3/2000 | |
| WO | 2011082374 A1 | 7/2011 | |
| WO | 2011082398 A1 | 7/2011 | |

OTHER PUBLICATIONS

BASF Aktiengesellschaft, "Product Specification, SIXOLUX Copper Gloss L3015," 1 pg. Sep. 18, 2002.
Project Advisory Committee Meeting, "Development of Cool Colored Roofing Materials," Oak Ridge National Laboratory and Livermore Berkeley National Laboratory, 55 pgs., Mar. 11, 2003.
Rhonda Strous, "Silica Sil as Nanoglue," Naval Research Laboratory, American Physical Society, Mar. 2000.

* cited by examiner

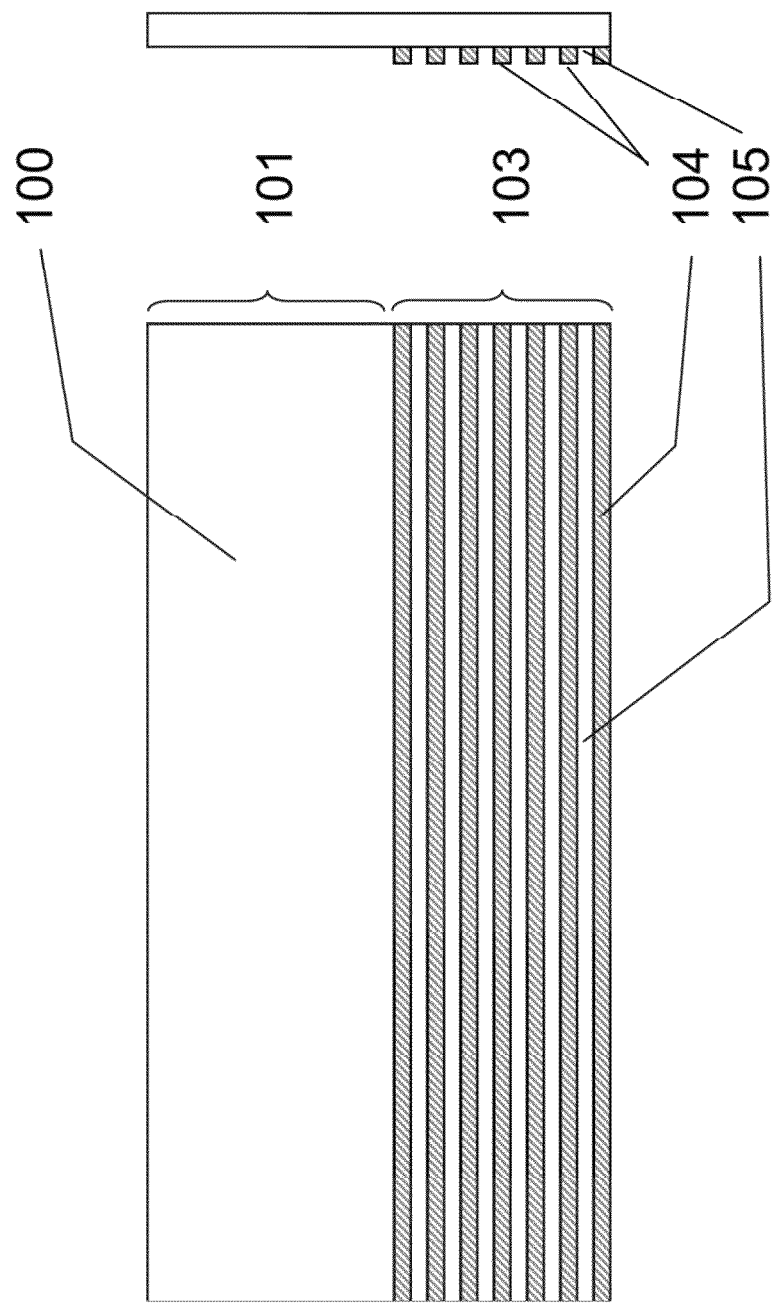

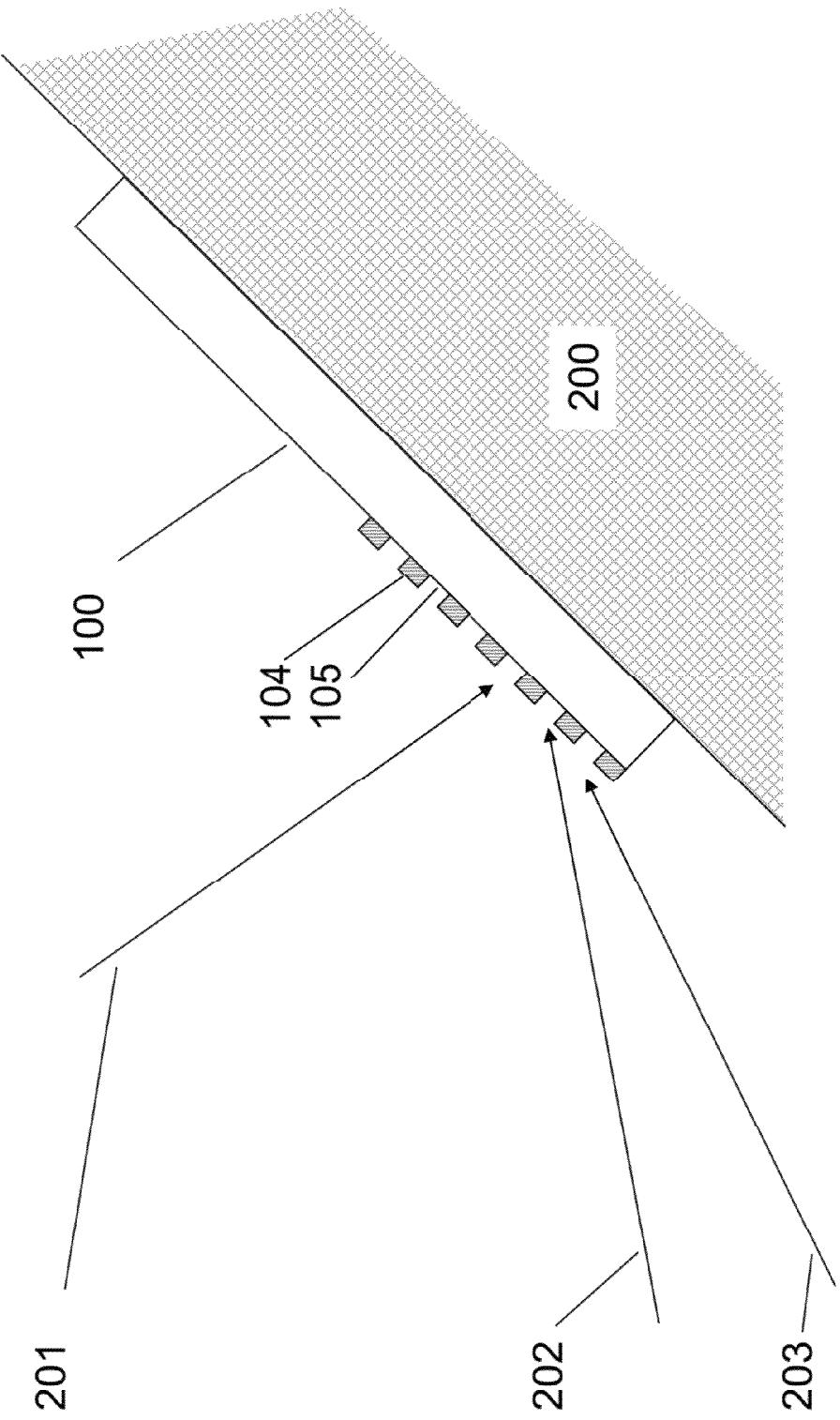

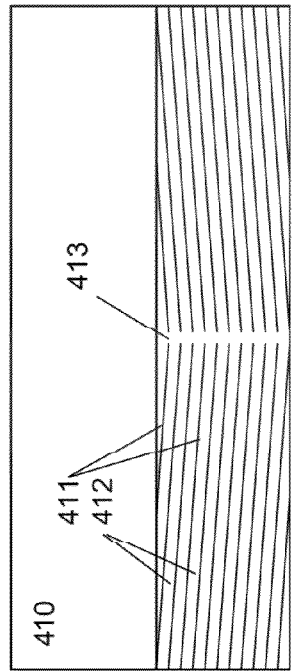
Fig. 4A
Fig. 4C
Fig. 4E
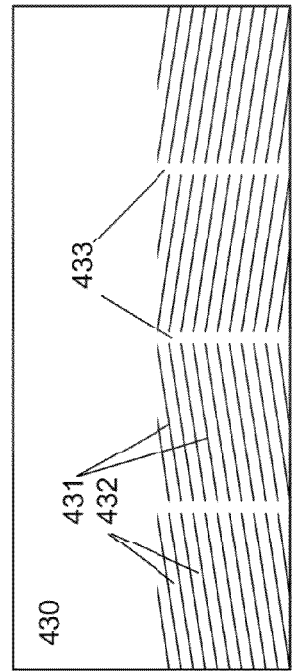
Fig. 4B
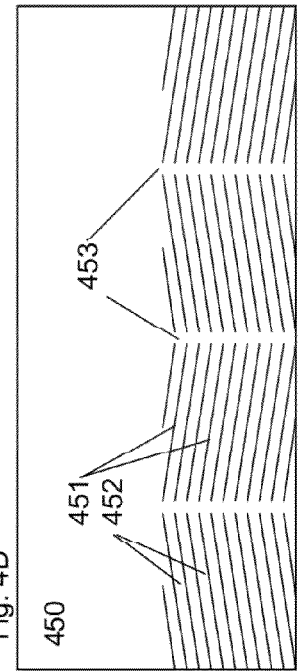
Fig. 4D
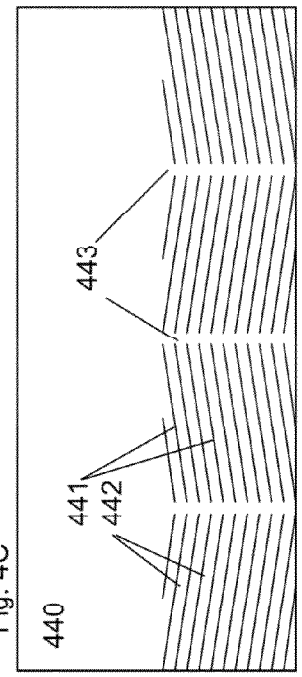
Fig. 4F

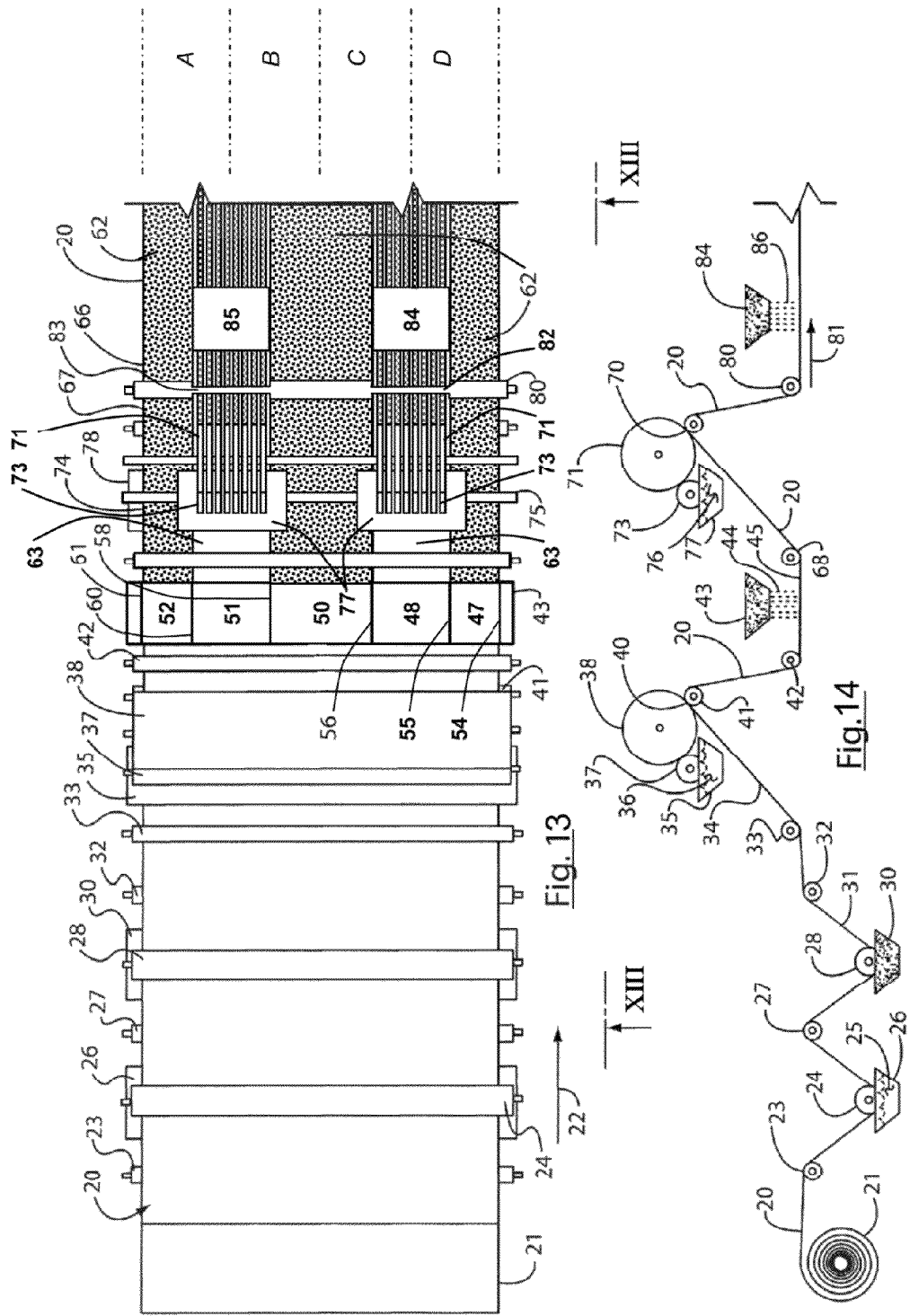

US 8,997,427 B2

SYSTEM, METHOD AND APPARATUS FOR INCREASING AVERAGE REFLECTANCE OF A ROOFING PRODUCT FOR SLOPED ROOF

This application claims priority to and the benefit of U.S. patent application Ser. No. 13/558,069, filed Jul. 25, 2012, now U.S. Pat. No. 8,673,427, which claims priority under 35 U.S.C. §119(e) to U.S. Patent Application No. 61/525,003, filed Aug. 18, 2011, both of which are assigned to the current assignee hereof and incorporated herein by reference in their entireties.

BACKGROUND OF THE INVENTION

1. Field of the Disclosure

The present invention relates in general to roofing and, in particular, to a system, method and apparatus for increasing an average reflectance of a roofing product on a sloped roof.

2. Related Art

It has been shown that surfaces of man-made structures, such as a roofing covering, cladding, or pavement surface, can absorb significant amounts of solar radiation. This causes the so-called "heat island effect," where the temperatures in an urban area tend to be several degrees higher than surrounding areas. As a result, significant amounts of solar heat flux can be absorbed due to those surfaces with low solar reflectivity, particularly on hot summer days. This not only increases the demand for indoor cooling energy, but also contributes to smog formation due to higher surface temperatures. Hence, it is beneficial to have a surface with increased solar reflectance to reduce solar heat gain thereby reducing the heat flux entering building envelopes or reducing surface temperatures for lowering smog formation.

This effect is particularly true for mineral-surfaced bitumen roofing products, such as those described in ASTM D225 and D3462. The bitumen or asphalt-based roof coverings are generally constructed from asphalt-saturated roofing felts and surfaced by pigmented color granules. However, such roofing granules and the resultant roofing membranes or asphalt shingles are known to have low solar reflectivity and hence will absorb solar heat especially through the near infrared range of the solar spectrum. As a result, it is common to measure temperatures as high as 160° F. to 170° F. on the surfaces of dark roofing shingles on a sunny day with 80° F. ambient temperatures. Thus, improvements in roofing products that are designed to reduce solar heat absorption continue to be of interest.

SUMMARY

Embodiments of a roofing product may comprise a substrate, coating the substrate with bitumen to yield a bitumen coated substrate having an exposure zone; adhering first granules to the exposure zone to yield a first granule coating, the first granules having a solar reflectance greater than 35; adhering an adhesive to at least a portion of the first granule coating; maintaining an open portion of the first granule coating that is free of the adhesive; and adhering an overlay of second granules to the adhesive, such that the overlay of second granules and the adhesive provide a raised structure above a plane of the first granule coating, the second granules having a non-white color.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and may be understood in more detail, a more particular description may be had by reference to the embodiments thereof that are illustrated in the appended drawings. However, the drawings illustrate only some embodiments and therefore are not to be considered limiting in scope as there may be other equally effective embodiments.

FIGS. 1A and 1B are schematic top and side views of an embodiment of a roofing product;

FIG. 2 is a side view of an embodiment of a roofing product mounted to a roof;

FIGS. 3A-3F and 4A-4F are schematic top views of additional embodiments of roofing products;

FIGS. 13 and 14 are schematic top and side views of a portion of a manufacturing line for producing roofing products.

The use of the same reference symbols in different drawings indicates similar or identical items.

DETAILED DESCRIPTION

Figure 3A:
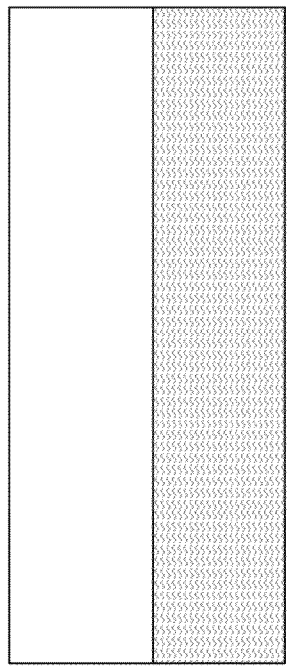

FIGS. 1A and 1B depict a roofing shingle 100 that has a headlap zone 101 and an exposure zone 103. When the shingle is installed on a roof substrate, the headlap zone 101 is covered by the exposure zone of an overlying course of shingles (not shown). An overlying shingle is applied with a lateral offset so that when a shingled roof structure is built up, the gaps between laterally adjacent shingles do not align in a way that may lead to roof leaks. The exposure zone 103 is visible and exposed to the elements in the installed condition. The exposure zone 103 includes a white highly reflective base 105. In FIGS. 1A and 1B, a plurality of granule covered overlays 104 with colored roofing granules is applied in a striped configuration. As can be seen in FIG. 1B, the overlays 104 have a raised structure above the plane of the surface of the highly reflective base 105

FIG. 2 depicts the shingle 100 on a roof 200. For clarity, other shingles are not shown. Light paths 201, 202 and 203 indicate several directions that light may impinge on the shingle. Light path 201 is close to normal to the surface of the shingle and light from this angle strikes the exposure area 103 including the highly reflective base 105 and the overlays 104. Light coming from direction 202 strikes the raised structures of the overlays 104 and a smaller portion of the highly reflective base 105. Light coming from direction 203 impinges on the vertical aspect presented by the overlays 104, but does not reach the highly reflective base 105 of the exposure zone 103.

Figure 3B:
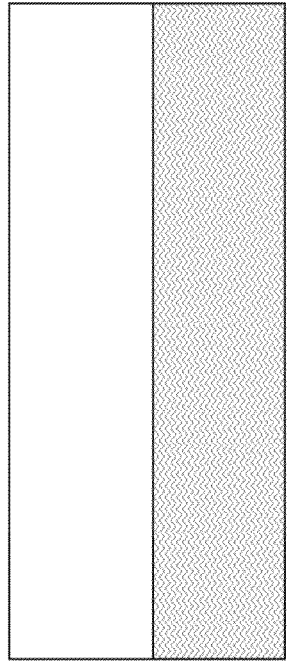
Figure 3C:
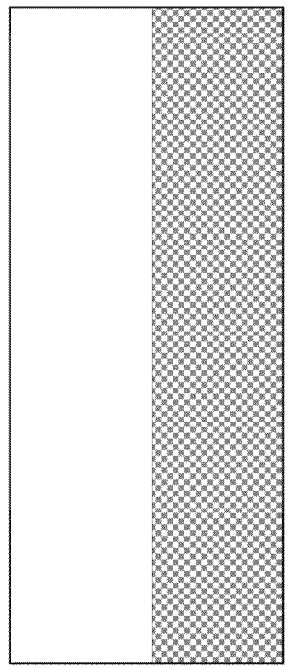
Figure 3D:
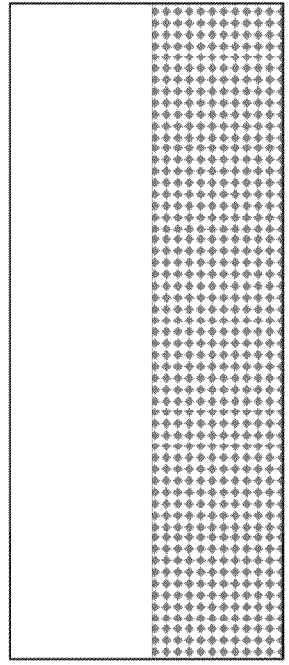
Figure 3E:
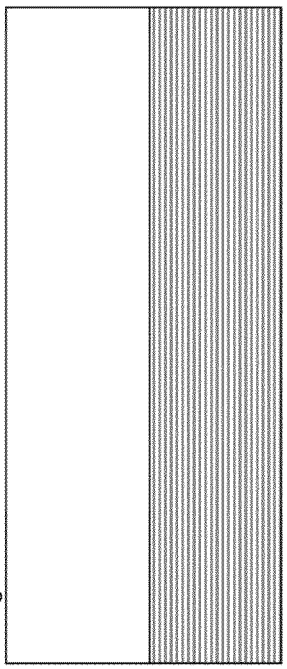
Figure 3F:
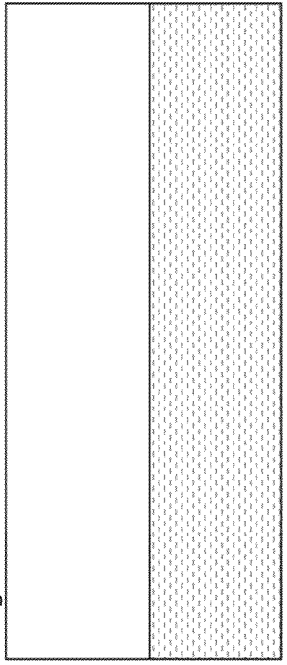

FIGS. 3A through 3F show an assortment of possible configurations for placement and shaping of the structures of overlays on the highly reflective base in the exposure zone of a roofing product. For example, FIGS. 3A and 3B show discontinuous wavy overlays and continuous wavy overlays, respectively. FIGS. 3C and 3D show checkered pattern overlays and diamond pattern overlays. FIGS. 3E and 3F show continuous striped patterned overlays and discontinuous striped pattern overlays, where the discontinuities and zones of overlay are laterally offset from one another.

In other embodiments (FIG. 4A), a shingle 400 has a highly reflective base 402 in the exposure zone with overlay stripes 401 having a diagonal aspect traversing downwardly from left to right across the shingle. The diagonal aspect may assist with drainage of water from the roof. A gap 403 may be provided in the overlay pattern to allow for water drainage in the central part of the shingle. In FIG. 4B, shingle 410 has a reflective base 412, overlays 411, and gap 413, wherein the overlays have a first diagonal portion (e.g., on the left of the exposure zone) traversing downward from left to right, and a second diagonal aspect (e.g., on the right) traversing downward from right to left.

In FIG. 4C, shingle 420 has overlays 421, base 422 and gap 423 similar to those of the embodiment of FIG. 4B, but the diagonal aspects are reversed. The left half of the exposure zone has overlays 421 that traverse downward from right to left, and the right half of the overlays 421 traverse downward from left to right. Shingle 430 of FIG. 4D depicts another embodiment similar to FIG. 4C, but having reflective base 432 partially covered with overlays 431 having an additional interruption or gap 433 in each of the right and left halves of the overlays 431 in the exposure zone. Shingle 440 of FIG. 4E also has additional gaps 443 and the reflective base 442 with the overlays 441 has the diagonal aspect alternating down to up to down to up, changing direction with each gap 443 as shown. In shingle 450 of FIG. 4F, the diagonal aspect of the overlays 441 of shingle 440 (FIG. 4E) is reversed such that it has the additional gaps 453 and the reflective base 452 with the overlays 451 having the diagonal aspect alternating up to down to up to down, changing direction with each gap 453.

In some embodiments (not shown) cutout slots are provided to yield a shingle with tabs. In some of those embodiments, the cutouts may align with or be synchronized with the gaps in the overlay structures. The slots may contribute additionally as a drainage path to drain water and keep moisture and debris from accumulating behind the overlays as water traverses down the roof.

Figure 5:
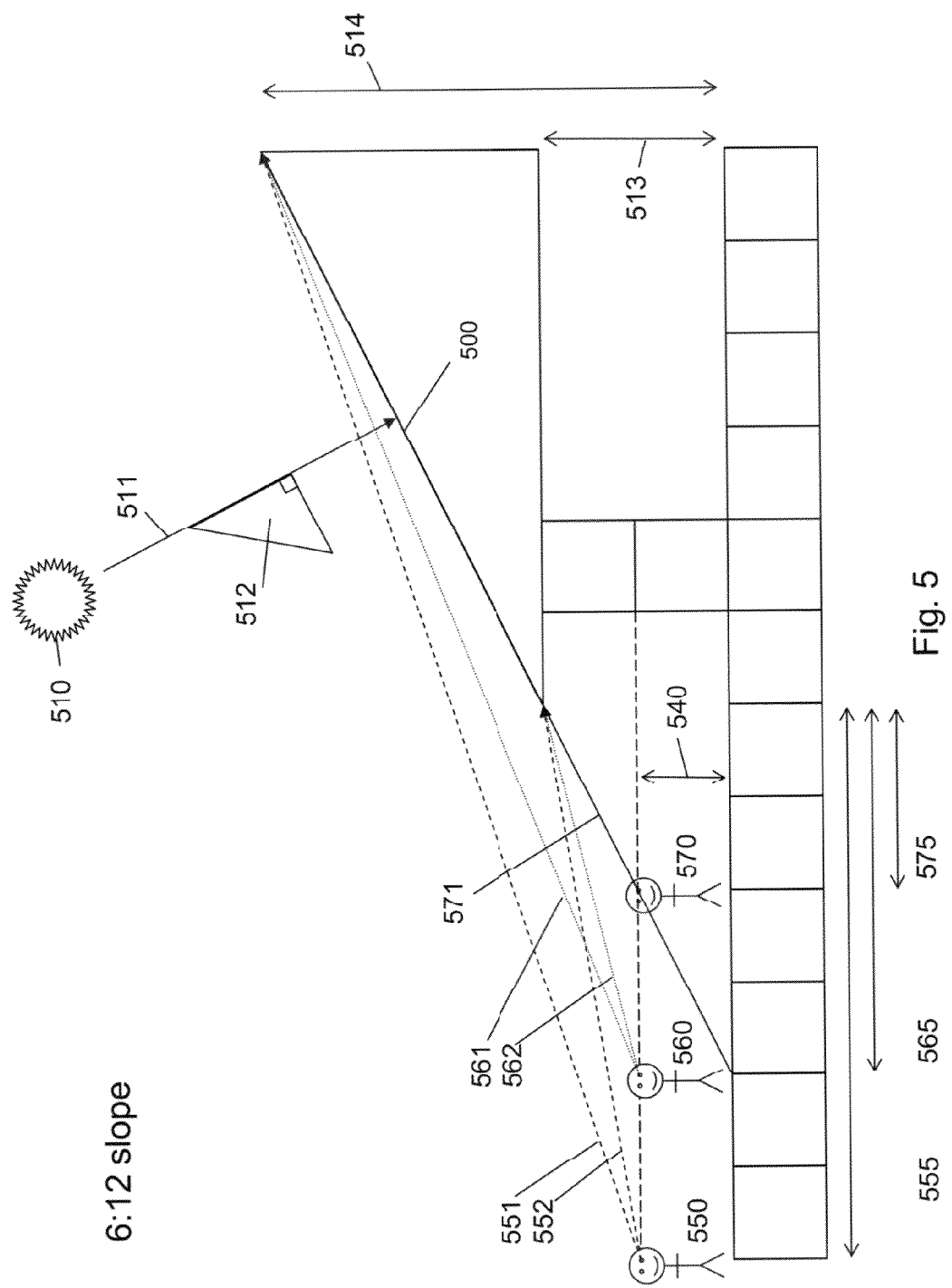
FIGS. 5-7 are schematic side views of roofs with various slopes.
Figure 6:
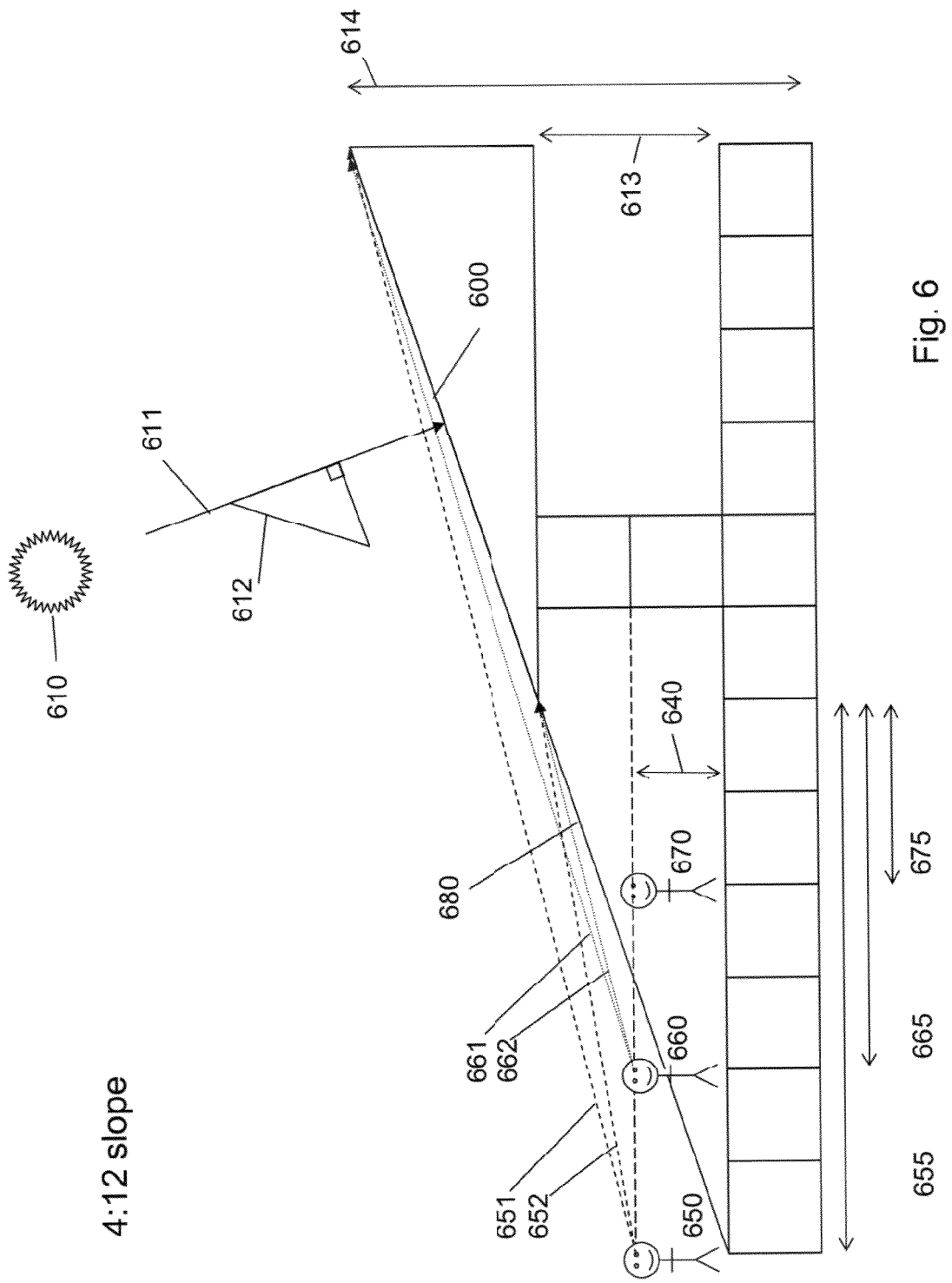
Figure 7:
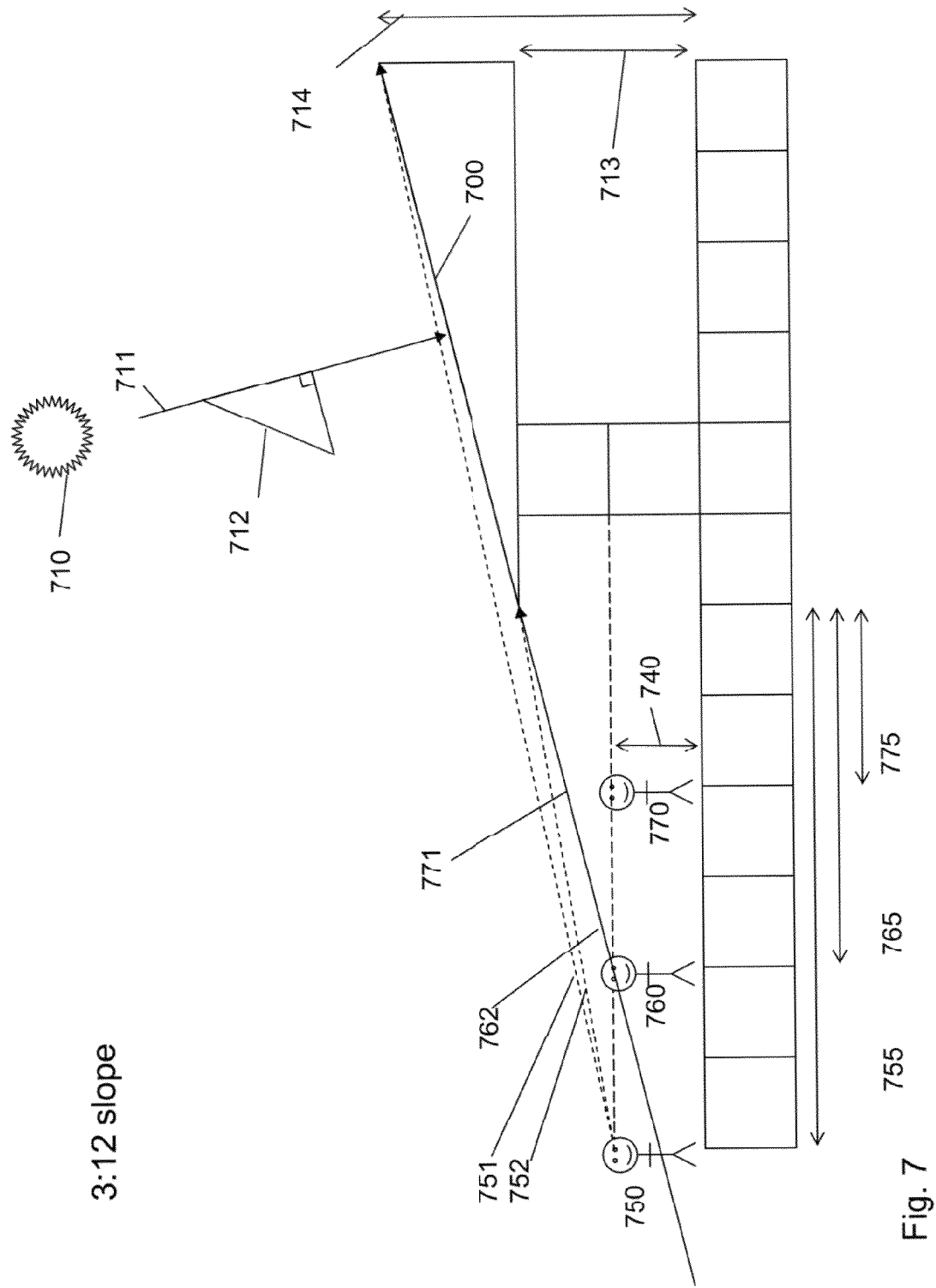

Referring now to FIGS. 5-7, schematic illustrations of roofs with three different slopes are shown. The dimensions given for these drawings are approximate and are intended for general reference purposes only. For example, FIG. 5 depicts a roof 500 having a 6/12 slope. The roof has an eaves height 513 and a peak height 514. A portion of light from the sky 510 is directed along a path 511 normal to the roof plane as indicated by right triangle 512. Observers 550, 560, and 570, having a viewing height 540 that is one half the eaves height 513, are located at distances 555, 565 and 575, respectively, from the end of the eave of the roof 500. The distance of observer 570 from the end of the eave is equal to the height of the eave. Observers 560 and 550 are at distance 565 twice the height of the eave, and distance 555 three times the height of the eave, respectively.

Observer 570 has a viewing height 540 and has a view along line 571 that aligns with a plane of the roof 500. Thus, observer 570 can see only the edge of the eave of the roof, but not the surface of the roof or the top of the roof. Observer 560 can see both the eave edge of the roof and the top of the roof along sight paths 562 and 561, respectively, as well as the surface of the roof at angles in between paths 561 and 562. Observer 550 can see both the eave edge of the roof and the top of the roof along sight paths 552 and 551, respectively, as well as the surface of the roof at angles in between paths 551 and 552. The angles at which observer 550 can see the roof are higher above the plane of the roof than the angles at which observer 560 can see the roof.

FIG. 6 depicts a roof 600 having a 4/12 slope. The roof has an eaves height 613 and a peak height 614. A portion of light from the sky 610 is directed along a path 611 normal to the roof plane as indicated by right triangle 612. Observers 650, 660, and 670, having a viewing height 640 that is one half the eaves height 613, are located at distances 655, 665 and 675, respectively, from the end of the eave of the roof 600. Line 680 is an extension of the plane of the roof 600. The distance of observer 670 from the end of the eave is equal to the height of the eave. Observers 660 and 650 are at distance 665 twice the height of the eave, and distance 655 three times the height of the eave, respectively. Observer 670 has a sight line that is below the eave and hence cannot see any portion of the roof. Observer 660 can see both the eave edge of the roof and the top of the roof along sight paths 662 and 661, respectively, as well as the surface of the roof at angles in between paths 661 and 662. Observer 650 can see both the eave edge of the roof and the top of the roof along sight paths 652 and 651, respectively, as well as the surface of the roof at angles in between paths 651 and 652. The angles at which observer 650 can see the roof are higher above the plane of the roof than the angles at which observer 660 can see the roof. The angles at which observers 650 and 660 can see the roof deck are smaller than those for observers 550 and 560 (FIG. 5) at similar distances from their respective roof 500.

FIG. 7 depicts a roof 700 having a 3/12 slope. The roof has an eaves height 713 and a peak height 714. A portion of light from the sky 710 is directed along a path 711 normal to the roof plane as indicated by right triangle 712. Observers 750, 760, and 770, having a viewing height 740 that is one half the eaves height 713, are located at distances 755, 765 and 775, respectively, from the end of the eave of the roof 700. Line 771 is an extension of the plane of the roof. The distance of observer 770 from the end of the eave is equal to the height of the eave. Observers 760 and 750 are at distance 765 twice the height of the eave and distance 755 three times the height of the eave, respectively. Observer 770 has a sight line that is below the eave and hence cannot see any portion of the roof 700. Observer 760 can see the eave edge of the roof along path 762, but no other portion of the roof. Observer 750 can see both the eave edge of the roof and the top of the roof along sight lines 752 and 751, respectively, as well as the surface of the roof at angles between paths 751 and 752. The angles at which observer 750 can see the roof deck are lower than those for observers 550 and 650 (FIGS. 5 and 6) at similar distances from their respective roofs.

Figure 8:
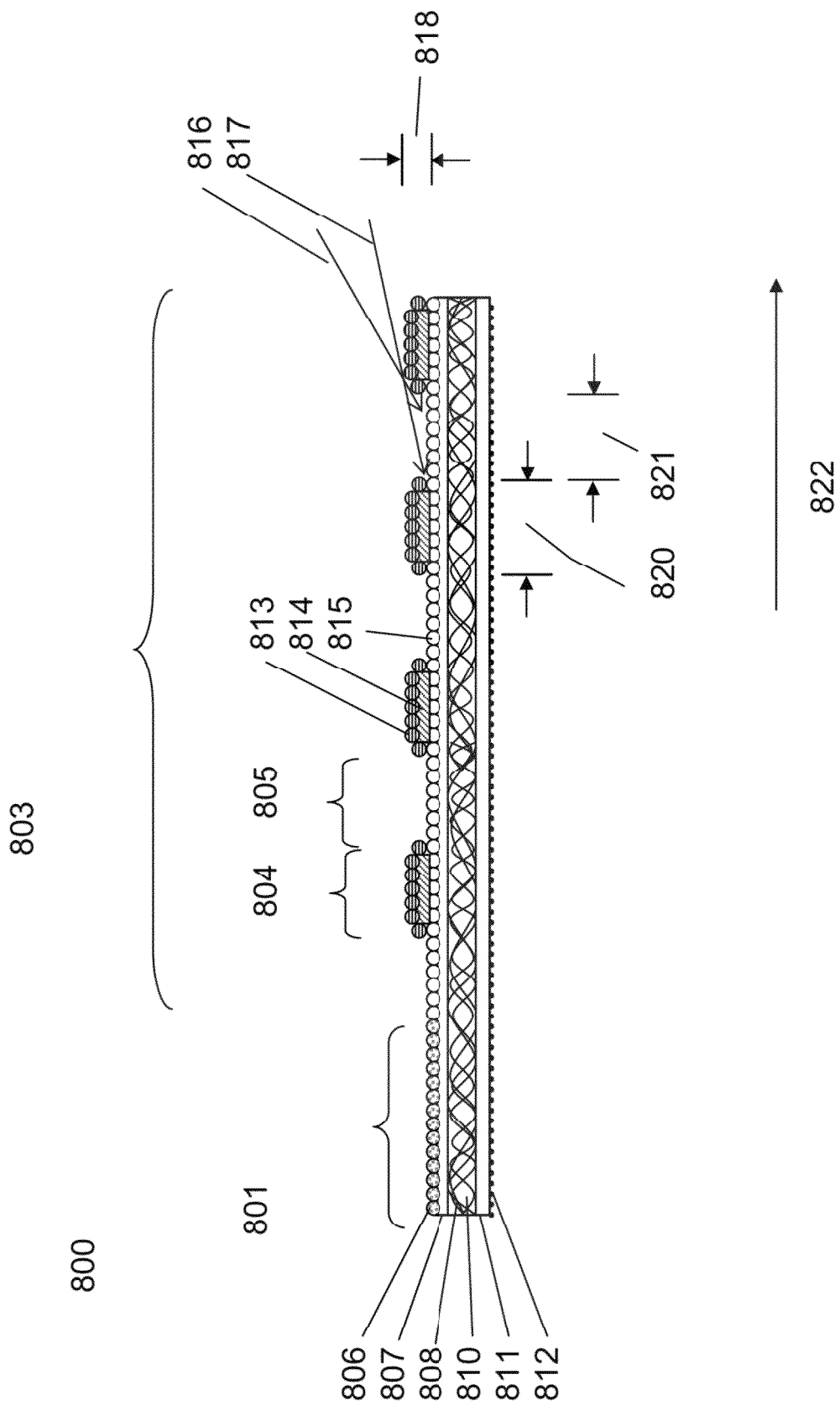
FIG. 8 is a schematic sectional side view of an embodiment of a roofing product.

Referring now to FIG. 8, an embodiment of a bituminous roofing product 800 has an exposure zone 803 and a non-exposed zone 801. In the case of a typical shingle, the non-exposed zone 801 would typically be larger, making up the remainder of a headlap zone. In the case of a roll roofing product, the non-exposed zone 801 would be a selvage edge for overlap and closure of the roof. The roofing product 800 has highly reflective base zones 805 covered by highly reflective granules 815. Overlay zones 804 include a layer of overlay adhesive 814 and are covered by colored granules 813. The bituminous roofing product 800 comprises a fibrous mat 808 that is saturated with bituminous material 810 and coated on its upper surface with another bituminous coating 807 and on its lower surface by additional bituminous material 811. The bituminous components 807, 810 and 811 may comprise the same materials or may comprise separate coatings of different materials having differing properties. Granules 806 are adhered to the upper surface of bituminous coating 807 in the non-exposure zone 801, and highly reflective granules 815 are adhered to the upper surface of the coating 807 in the exposure zone 803. Non-exposure zone granules 806 may be different from the granules 815 in the exposure zone 803 as, in many cases, they will not be exposed to the environment when the roofing product 800 is installed. Arrow 822 indicates a downroof direction for the roofing product when it is installed. The overlay zones 804 have a height 818, a width 820 and a separation distance 821. Arrows 816 and 817 indicate observation paths at high angles off-normal (i.e., perpendicular to the roof), such as may be encountered when an observer looks up at a sloped roof at different distances from the building. An observer looking at the roof along path 816 would be able to see a portion of, but not the entire highly reflective base zones 805. An observer looking at the roof along path 817 would see only the overlay zones 804.

The apparent color and reflectance of an object is averaged over a field observation. For the roofing product 800 depicted in FIG. 8, the area of the exposure zone 803 is about half highly reflective base zones 805 and about half overlay zones 804. The apparent average color from a perspective normal to the surface of the roofing product would be the average of the color of the reflective base zones 805 and that of the overlay zones 804. From a point of view along observation path 816, the average color would have a larger component of the overlay zones 804 than of the reflective base zones 805. From a point of view along the observation path 817, the color would be dominated by the color of the overlay zones 804. In some embodiments, the raised structures of the overlay zones 804 provide a dominant component of the color of the roofing product 800 when viewed from a down roof position at an angle of at least 65° off normal, or at an angle of at least 70° off normal, or at an angle of at least 75° off normal, or at an angle of at least 80° off normal, or at an angle of at least 85° off normal.

Figure 9:
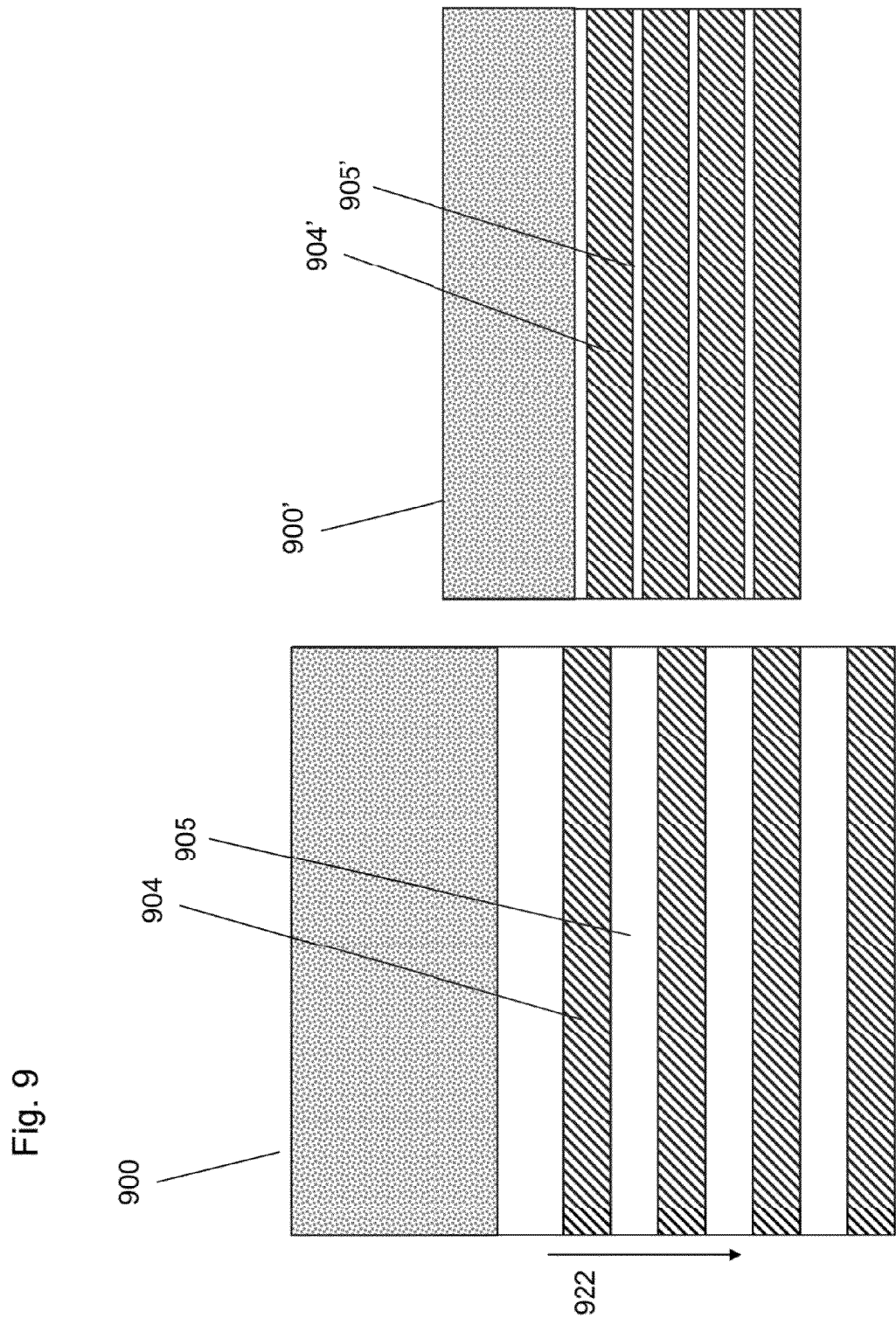
FIGS. 9-12 depict top views and projected angled views of the tops of various embodiments of a roofing product.

FIG. 9 shows a top view of an embodiment of a roofing product 900 that has highly reflective base zones 905 and colored overlay zones 904 with raised structures. Arrow 922 indicates a down roof direction for the product 900 when it is installed on a roof. Roofing product 900' is shown in a projected view as it may appear on an inclined roof surface with the lower edge rotated toward the viewer and the upper edge rotated away from the viewer. In this view, the overlay zones 904' with their raised structures present a greater portion of the area visible to the observer, and the highly reflective zones 905' are partially obscured by the raised structures of the overlays 904'. The visual aspect and color of the overlay zones 904' dominate the appearance of the roofing product 900' on a sloped roof of a building as seen from the ground.

Figure 10:
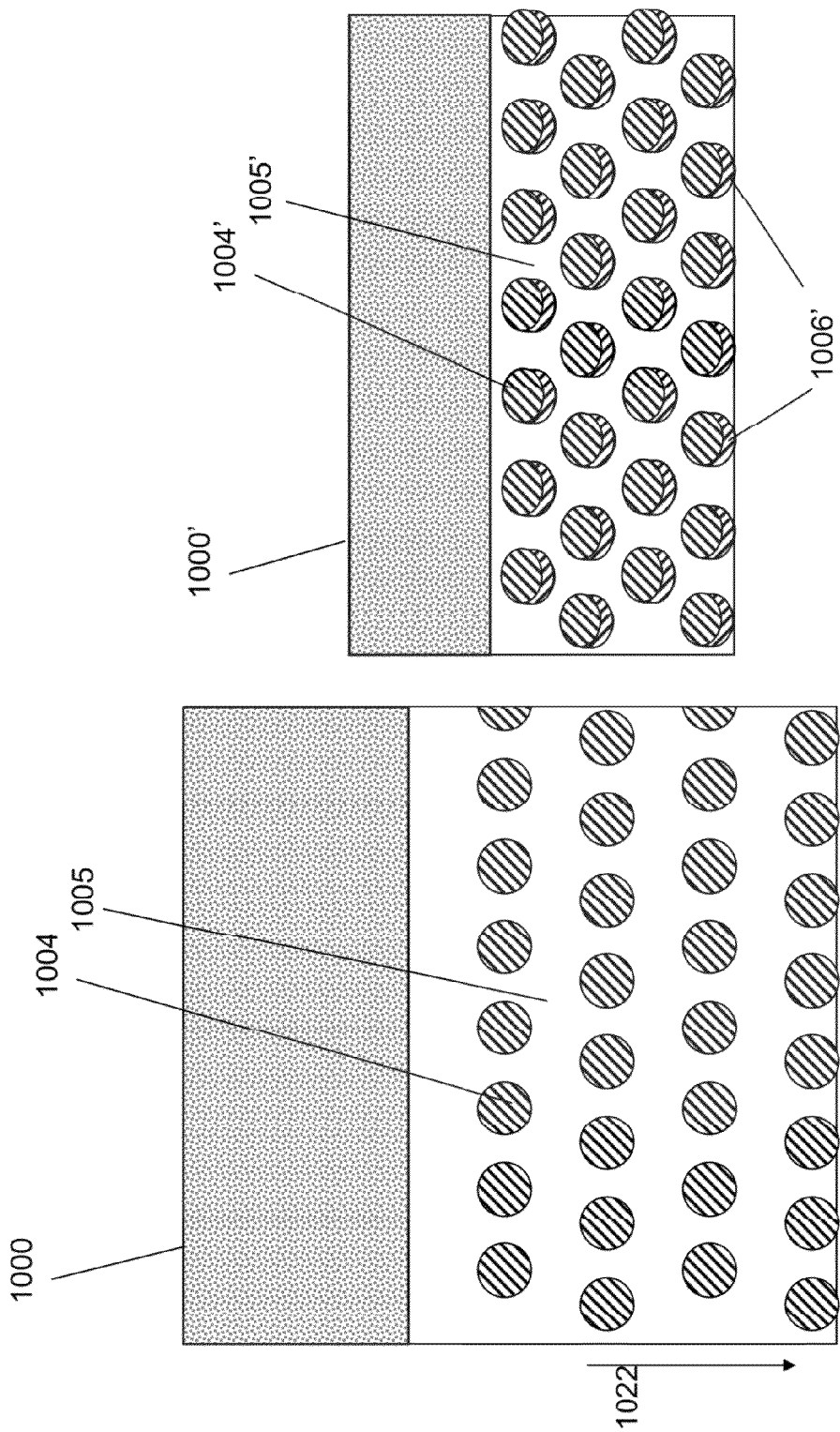

Similarly, FIG. 10 shows a top view of another embodiment of a roofing product 1000 that has highly reflective base zones 1005 and colored overlay zones 1004 with raised structures. In this case, the overlay zones 1004 comprise an array of short cylinders. The cylinders 1004 comprise a discontinuous overlay pattern that permits water drainage on the roof. The spaces between the overlays 1004 are also more open. Thus, a greater area of the highly reflective base zone 1005 is exposed to increase the reflectivity in a skyward direction. Arrow 1022 indicates a down roof direction for the product 1000 when it is installed on a roof. Analogously to the view in FIG. 9, roofing product 1000' is shown in a projected view as it may appear on an inclined roof with the lower edge rotated toward the viewer and the upper edge rotated away from the viewer. In this view, the overlay zones 1004' with their raised structures present a greater portion of the area visible than in the top view of product 1000. The highly reflective zones 1005' are partially obscured by the raised structures of the overlays 1004'. The downwardly directed edges of the raised structures 1006' are presented and contribute to the color and appearance of the product 1000'. The visual aspect and color of the overlay zones 1004' affect the appearance of the roofing product 1000' on a sloped roof of a building as seen from the ground by an observer.

Figure 11:
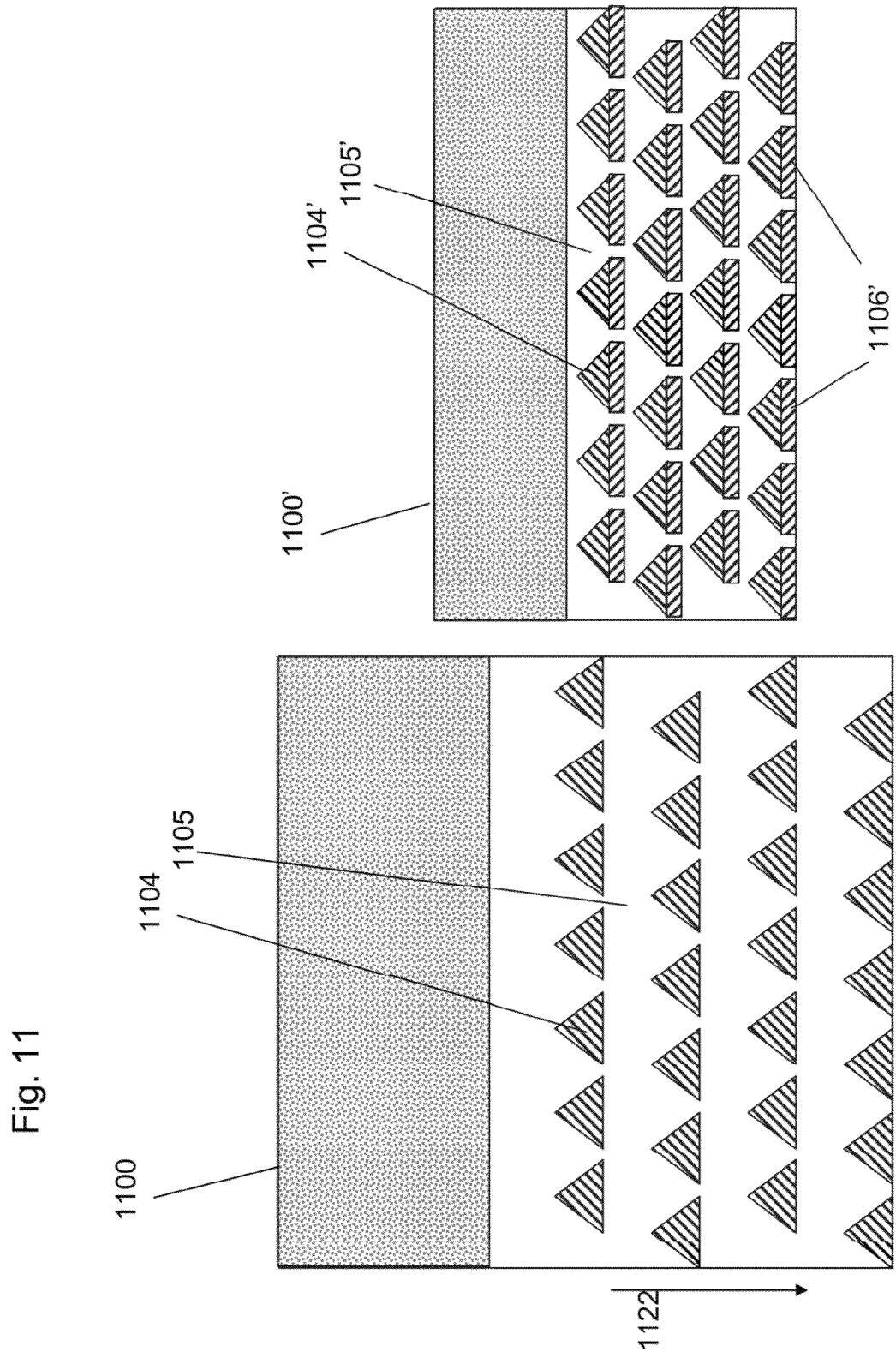

FIG. 11 shows a top view of another embodiment of a roofing product 1100 having highly reflective base zones 1105 and colored overlay zones 1104 with raised structures. The overlay zones 1104 may comprise an array of triangular overlay elements 1106, such as equilateral triangles. The overlay elements comprise a discontinuous overlay pattern that can allow for drainage of water on the roof. The spaces between the overlays are also more open and a greater area of the highly reflective base zone 1105 is exposed to increase the reflectivity in a skyward direction. In the case of product 1100, the base of each of the triangular elements is oriented in a direction 1122 down roof for the product when it is installed on a roof. Analogously to the views in FIGS. 9 and 10, roofing product 1100' is shown in a projected view as it may appear on an inclined surface with the lower edge rotated toward the viewer and the upper edge rotated away from the viewer. The overlay zones 1104' with their raised structures present a greater portion of the area visible than in the top view of product 1100 and the highly reflective zones 1105' are partially obscured by the raised structures of the overlays 1104'. In product 1100' the downwardly directed base of the triangular overlay elements 1104' provides a greater area of overlay zone contributing to the field of view of the roofing product on the roof. The downwardly directed edges of the raised structures 1106' are presented and contribute to the color and appearance of the product 1100'. The visual aspect and color of the overlay zones 1104' affect the appearance of the roofing product 1100' on a sloped roof of a building as seen from the ground by an observer.

Figure 12:
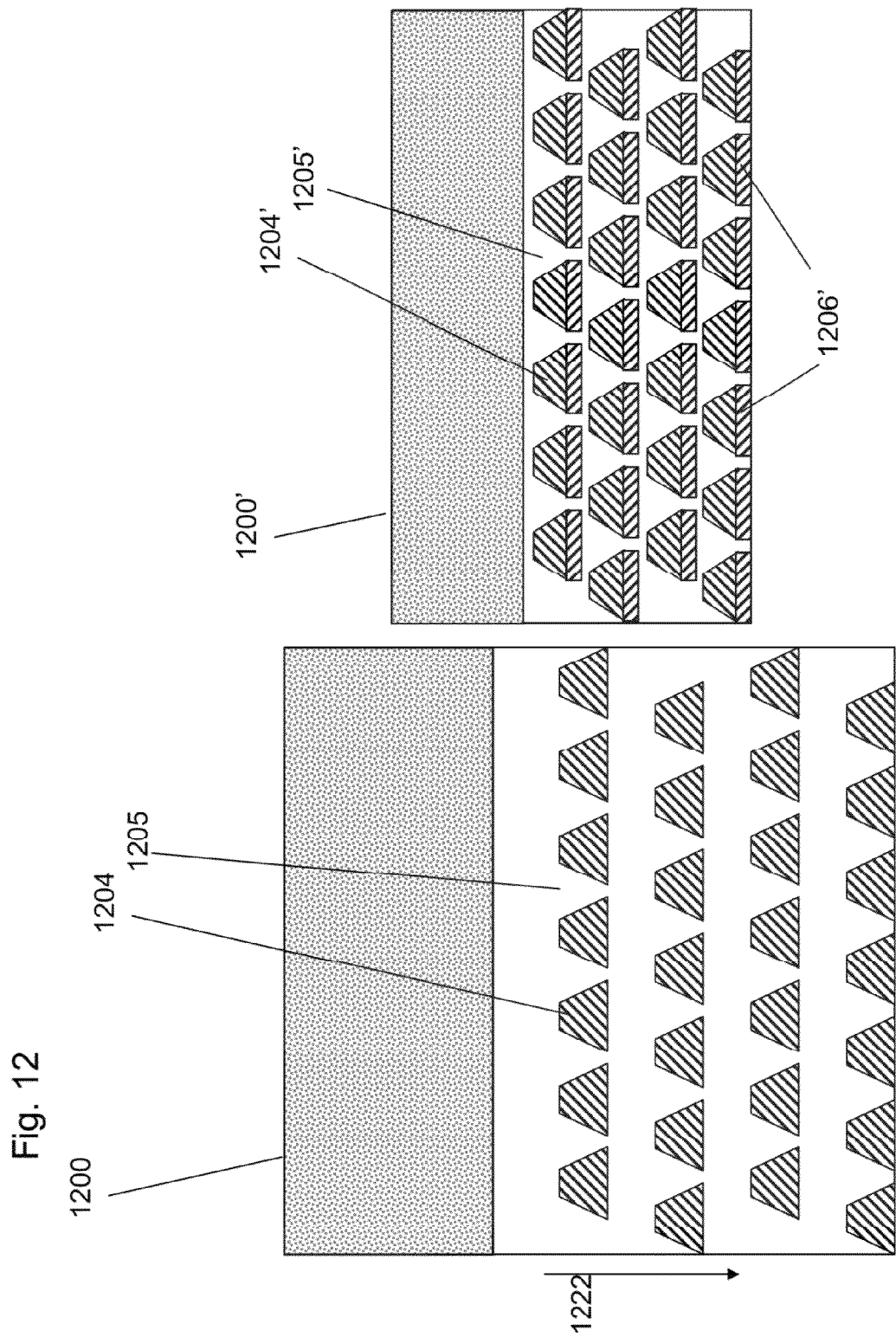

FIG. 12 shows a top view of another embodiment of a roofing product 1200 that has highly reflective base zones 1205 and colored overlay zones 1204 with raised structures. In this case, the overlay zones 1204 comprise an array of trapezoidal overlay elements 1206. As in FIG. 11, the overlay elements 1204 comprise a discontinuous overlay pattern for better drainage, spaces between the overlays are also more open, and a greater area of the highly reflective base zone 1205 is exposed to increase the reflectivity in a skyward direction. In the case of product 1200, the longest side or base of each of the trapezoidal elements 1206 is oriented in a direction 1222 down roof for the product when it is installed on a roof. The roofing product 1200' is shown in a projected view as it may appear on an inclined surface with the lower edge rotated toward the viewer and the upper edge rotated away from the viewer. In this view the overlay zones 1204' with their raised structure present a greater portion of the area visible than in the top view of product 1200, and the highly reflective zones 1205' are partially obscured by the raised structures of the overlays 1204'. In product 1200' the downwardly directed base of the trapezoidal overlay elements 1204' provides a greater area of overlay zone contributing to the field of view of the roofing product on the roof. The downwardly directed edges of the raised structure 1206' are presented and contribute to the color and appearance of the product 1200'. The visual aspect and color of the overlay zones 1204' affect the appearance of the roofing product 1200' on a sloped roof of a building as seen from the ground.

FIGS. 13 and 14 depict a portion of an embodiment of a process for producing a roofing product as described herein. The roofing product may have a light colored solar reflective zone with its area partially covered by a colored granule covered overlay having a raised structure. For example, a sheet 20 comprising an indefinite length of fibrous material, such as organic or inorganic mat, is provided, which may or may not be provided in the form of a roll 21, and may be impregnated or become impregnated with a bituminous material such as asphalt. The mat 20, as it travels in its longitudinal path 22, may pass over a roller 23, beneath another transverse roller 24 to impregnate at least the lower surface of the fibrous sheet 20 with an adhesive 25 (e.g., a bituminous material such as asphalt) from a transverse tank 26. The fibrous sheet 20 then passes over another transverse roller 27 and beneath another roller 28, disposed in a particle application trough 30, or the like, for adherence of tiny granule particles such as sand, mica, or the like to the undersurface 31 of the fibrous sheet 20. It will be understood that other techniques for applying an adhesive to the fibrous sheet 20 may be employed, such as by running the sheet 20 through a bath of adhesive. Similarly, other techniques for applying tiny granules such as sand, mica or the like to the undersurface 31 of the fibrous sheet 20 may likewise be employed, as alternatives. As a further alternative, the tiny granules could be applied at a different time, for example, at a later time.

The fibrous sheet 20 may then pass over and under another series of rollers 32, 33, to a location where an adhesive such as asphalt or other bituminous material is applied to the top surface 34 of the sheet 20. In the embodiment of FIGS. 13 and 14, such adhesive may be applied from a transverse adhesive trough 35 by applying the adhesive 36 to a roller 37 arranged in the trough 35, which, in turn, applies the adhesive to another, larger roller 38, which applies the adhesive as the upper surface 34 as the fibrous sheet 20 passes through the nip 40 between the large roller 38 and another roller 41.

The impregnated sheet 20 may then pass around another transverse roller 42 before traveling beneath a granule applicator 43, for deposit of granules 44 on an upper surface 45 of the sheet 20. The granule applicator 43 may be divided into a plurality of application zones 47, 48, 50, 51, and 52, separated by walls 54, 55, 56, 58, 60 and 61. Granules from zones 47, 50, and 52 may comprise post-industrial granules or lower cost or scrap granules or recycled granules and are shown as dark granules. These are deposited in longitudinal bands 62, shown at the right of FIG. 13, from between walls 54 and 55, 56 and 58, and 60 and 61 of granule applicator 43. The bands 62 of darker granules form the front surface of the headlap of the shingle layer after longitudinal cutting and finishing of the shingles. Zone 47 provides the headlap granules for shingles in lane D, zone 50 provides headlap granules for lanes C and B, and zone 52 provides headlap granules for lane A of the sheet 20.

Granules from zones 48 and 51, between walls 55 and 56, and 58 and 60, respectively, are shown as lighter colored granules, and are preferably white granules of high solar reflectivity. The granules from zones 48 and 51 are deposited in longitudinal bands 63, on a portion of the sheet 20 that will form the base of the exposure area of the shingle layer. Zone 48 provides the highly reflective granules for the exposure zones of the shingles in lanes A and B, and zone 51 provides the highly reflective granules for the exposure zones of the shingles in lanes C and D.

After the granules are dropped onto the upper surface of the fibrous sheet 20, the sheet 20 passes beneath a roller 68, to be delivered to nips 70 beneath adhesive applicator rollers 71 that receive adhesive via rollers 73 carried on shaft 75. The rollers 73 are, in turn, engaged with adhesives 76 in adhesive troughs 77, to apply a plurality of continuous or discontinuous zones of adhesive to the upper surface of the portion of the sheet 20 that will comprise the exposure area of the shingle layers. The sheet 20 with the adhesive applied via rollers 71, then passes beneath roller 80, as the sheet 20 moves longitudinally rightward as shown in the direction of the arrow 81 in FIG. 14.

In some embodiments, the roller 80 may comprise two necked-down portions of reduced diameter, 82 and 83, where longitudinal strips of adhesive may be applied via rollers 71, to keep adhesive from being smeared by the surface of the roller 80, as the thin adhesive bands pass beneath the roller 80. The sheet 20 may be delivered beneath overlay granule applicators 84 and 85, which deposit overlay granules 86, preferably dark in shading, and more preferably having high solar reflectance, onto the thin longitudinal bands of adhesive applied via adhesive applicator rollers 71.

Alternatively, the sheet 20 may be routed in a different way, so that an adhesive 76 is applied by contact with a roller, prior to the granule 86 application. The adhesive 76 can be continuous or discontinuous as noted above, and may be applied in a pattern or shaped application, as desired.

After application of the overlay granules 86, the sheet 20 may progress through conventional shingle finishing operations where the lanes of shingle material A, B, C and D are slit and cut to length and packaged. It will be understood that the shingles may optionally be provided with cutouts to form tab shapes. Alternatively the shingles could be absent such cutouts. It will also be understood that the shingle layer produced could be laminated onto one or more other layer(s) in a laminated shingle construction, the sheet 20 with the overlays partially covering the exposure area with the highly solar reflective granules providing the anterior layer of such a construction. Other embodiments of a roofing product and method of making a roofing product may comprise providing a substrate; coating the substrate (e.g., a shingle, roll roofing product, fiberglass web, etc.) with bitumen to yield a bitumen coated substrate having an exposure zone; adhering first granules to the exposure zone to yield a first granule coating, the first granules having a solar reflectance greater than 35 or 50; adhering an adhesive (e.g., an organic polymer, a bituminous adhesive, etc.) to at least a portion of the first granule coating; maintaining an open portion of the first granule coating that is free of the adhesive; and adhering an overlay of second granules that are non-white in color to the adhesive, such that the overlay of second granules and the adhesive provide a raised structure that is distributed substantially across the exposure zone above a plane of the first granule coating. The substrate, exposure zone and first granule coating may be planar and flexible.

The method may further comprise providing a bonding adhesive layer on a rear surface of the web, and the bonding adhesive layer may be a self-adhesive layer and a release liner is provided on the rear surface of the web. At least a portion of the raised structure may be positioned closer to an exposed edge of the substrate than the open portion of the first granule coating. The raised structure may provide a dominant component of a color of the roofing product when viewed from a down roof position at an angle of at least 60° off normal, at least 70° off normal, at least 75° off normal, or at an angle of at least 80° off normal.

Another embodiment of a method of making a roofing product may comprise providing a web; coating the web with bitumen to yield a bitumen coated web having an exposure zone and a headlap zone; adhering first granules to the exposure zone, the first granules having a solar reflectance greater than about 50, 60, 70 or 80; adhering second granules to the headlap zone; applying an adhesive to at least a portion of the first granules in the exposure zone; maintaining an open portion of the first granules that is free of the adhesive; and adhering an overlay of third granules to the adhesive such that the overlay of third granules and the adhesive provide at least one (or a plurality of) raised structure(s) above a plane of the first granules in the exposure zone, and the third granules have a non-white color. The raised structure may be positioned on the web such that in an installed condition of the roofing product on a roof, at least some of the raised structure is down roof from at least some of the open portion. The third granules may have a solar reflectance greater than about 25, 30, 35, 40 or 45.

The exposure portion may have a predetermined lateral direction and a vertical direction with respect to a down roof direction when the roofing product is installed on a roof. The third granules may vary in color in the lateral direction. The raised structures may vary in color in a lateral direction, and/or in a vertical direction, and/or in a down roof direction. The raised structures may be continuous, discontinuous, intersect, parallel, vary in shape and/or size, be wavy in shape, vary in a crossweb position in a downweb direction, and/or have a shape selected from the group of consisting of circles, ellipsoids, polygons, squares, checks, rectangles, parallelograms, chevrons, triangles, and trapezoids. The raised structures may cover less than about 50, 40 or 30 percent of the exposure zone. The raised structures have a width between about 8 mm and about 40 mm, or between about 10 mm and about 30 mm. The raised structures may vary in height, have a height between about 1 mm and about 5 mm, or between about 2 mm and about 4 mm.

The method may further comprise a finishing step wherein cutouts are formed and the web is slit and cut to length to yield a tabbed shingle, or a finishing step wherein the roofing product is laminated to at least a second layer and cut to length to yield a laminated shingle. The laminated shingle may have a dragon's tooth configuration and a back shim layer.

In additional embodiments, a roofing product comprises a substrate having an exposure zone and a headlap zone; a bitumen layer on the substrate; first granules on the bitumen layer in the exposure zone, the first granules having a solar reflectance greater than 35; an adhesive on only some portions of the first granules, such that the first granules have an open portion that is free of the adhesive; and an overlay of second granules that are non-white in color on the adhesive, such that the overlay of second granules and the adhesive form raised structures that are distributed substantially across the exposure zone above a plane of the first granules. Other embodiments may be provided as described herein.

Another embodiment of a method of making a layer of roofing product may comprise the steps of providing a sheet (e.g., metal, fiberglass web, etc.); coating the sheet with an adhesive (e.g., an organic polymer, bituminous adhesive, etc.) to yield an adhesive coated sheet having a front surface and a rear surface; denoting an exposure portion and a non-exposure portion of the sheet; adhering a front layer of first granules to the front surface of the exposure portion of the sheet to yield a first granule coated front surface; adhering an overlay adhesive coating (e.g., bituminous) to at least a first zone of the first granule coated front surface of the exposure portion; maintaining at least a second zone of the first granule coated front surface of the exposure portion free of the overlay adhesive coating; and, adhering an overlay layer of second granules to the first zone of the overlay adhesive coating such that the overlay layer of the second granules and the overlay adhesive coating provide a raised structure above a plane of the exposure portion; wherein the first granules have a solar reflectance greater than 50; and the second granules have a non-white color.

Further embodiments of a roofing product comprise a granule-covered roofing shingle substrate with an exposure portion and a headlap portion that is covered by a next overlying course of shingles when the roofing product is installed. The exposure portion has a base of highly solar reflective roofing granules. In some embodiments, the highly solar reflective roofing granules are white or light in color. Selected portions of the exposure area are covered with an application of overlay adhesive which is surmounted by an application of colored granules to yield a colored zone having a raised structure (i.e., greater thickness) above the plane of the highly solar reflective granules. A portion of the base of highly solar reflective granules remains uncovered in the exposure area. When the roofing product is installed on a sloped roof, the raised structures with the colored granules present a projected area of color to a viewer of the roof located on the ground, such that the white or light colored highly solar reflective portions of the base of the exposure zone of the roofing product are significantly or substantially obscured. When the roof is viewed from the sky, the solar reflective area is substantially visible and contributes to a higher average solar reflectance while presenting a desirable darker colored aesthetic to the viewer at ground level.

Additional aspects include methods of fabricating a roofing product having a structured surface comprising coating a substrate with an adherent for roofing granules, applying light colored highly solar reflective granules in an exposure zone, and selectively applying an overlay adhesive and darker colored overlay granules to create raised structures on the surface of the exposure zone of the roofing product. When the finished roofing product is installed on a roof, the raised structures present a colorful appearance to a viewer on the ground and at least partially obscure the light colored highly reflective portions of the exposure zone.

For example, horizontal overlays may be provided on a substantially white base roofing product. The white base product in the absence of the overlays can have a high solar reflectivity of at least about 50 percent, at least about 60 percent, at least about 70 percent, or at least about 80 or 85 percent. The overlays are preferably non-white in color and project a raised structure above the plane of the white base product. When the roofing product is viewed from a grazing angle, the overlay structures significantly obscure the white base areas of the product and present a colored aesthetic to the observer. From a skyward viewpoint, the white base area contributes to the overall reflectance of the roofing product.

The colored non-white roofing granules can be conventional colored roofing granules. Alternatively, the colored granules can be granules with a higher solar reflectance, such as those described, for example, in U.S. Pat. Nos. 7,241,500, 7,919,170, 7,648,755, and 7,455,899, which are incorporated herein by reference in their entirety. When solar reflective granules are used, the contribution of the white portion of the product increases the overall average reflectance in vertical directions above a roof over the reflectance obtained solely with the solar reflective granules, while still providing desirable color and appearance from the street level.

The granules used on the overlay portions can vary laterally along the length of the roofing product. Color blends known in the shingle art may be applied to the overlays during manufacture of the shingles. The colors also may vary vertically on the roofing product, such that different portions of overlay can be provided with differing colors of granules as desired.

The overlay may be applied to the white base in a variety of configurations to provide structures that present a major component of the color of the roofing product at high observation angles. In a simple configuration, stripes of overlay are applied to the product. The stripes may be continuous or discontinuous with periodic interruptions. The overlay may comprise straight lines or a series of straight lines. The overlay also may comprise wavy lines. Areas of overlay may be parallel or non-parallel. The spacing of the overlays may vary along the length of the roofing product or, in some instances, the overlay areas may intersect.

A variety of other patterns of overly may also be employed such as checkered patterns, offset dots or chevrons, circles, ellipsoids, polygons, squares, checks, rectangles, parallelograms, chevrons, triangles, and trapezoids, for example. Regular or irregular shapes may be employed. In one aspect, the shapes have a larger dimension oriented down roof on the roofing product so as to increase the projected area of the overlay to a street level viewer. For example, a trapezoidal shape of overlay may be oriented such that its longer base side of the trapezoid is located closer to the lower edge of the roofing product than its opposite and shorter side.

In one aspect the roofing product is provided with discontinuities or openings that are not coated with the overlay so as to have drainage paths for water to shed down the roof. In some instances, a non-horizontal component of the overlay lends itself to guiding flow of moisture downwardly.

The roofing product with the white base and colored overlay in an exposure zone may comprise a variety of types. Shingles are typically constructed of asphalt, metal, plastic or similar material in sheet form. In a particular embodiment, the roofing product is an asphalt shingle. The shingle may have a variety of configurations or shapes for the exposure zone and may include cutouts, slots and tabs as are known in the art, or may not have tabs. The shingle may comprise a single layer. In another embodiment, the shingle is a laminated shingle and the top layer or anterior shingle layer of the multilayer construction includes a solar reflective white base portion(s) and colored overlay portion(s) in the exposure zone of the shingle.

The roofing product is well suited for being disposed on a sloped roof. Architecturally, roof slopes can vary depending on the style of a building. Roof slopes for buildings having shingle applications can be expressed in pitch as the ratio of rise over run for the roof deck in a direction moving up the roof. For example a 12/12 slope roof increases in height 12 ft for every 12 ft farther back from the roof edge. The pitch corresponds to the ratio used to calculate the tangent of the angle of the roof surface above a horizontal plane. Roofs can have pitches greater than 12/12 or less than 12/12, such as 6/12, 4/12, 3/12. For shingled roofs, pitches can be as low as 2/12 and still maintain water shedding capability of the shingles.

Depending on the slope of the roof for the roofing product, the dimensions and relative area coverage of the raised structure of the overlays may be selected so as to provide sufficient projected area contribution to the color when the roof is viewed from the ground. For example, a product for a steep sloped roof may have a thicker or higher raised overlay structure in the exposure area of the product. On a given roofing product the raised structures can vary in size. In some embodiments, the raised structures cover less than about 60 percent, or less than about 50 percent, or less than about 40 percent, or less than about 30 percent of the exposure zone. The width of the raised structures in an uproof/downroof direction can be more than about 8 mm, or more than about 10 mm, or more than about 15 mm, or more than about 25 mm, or more than about 30 mm. In other embodiments, the width of the raised structures can be less than about 50 mm, or less than about 40 mm, or less than about 30 mm, or less than about 25 mm. The height of the raised structures can be more than about 1 mm, or more than about 2 mm, or more than about 3 mm. The height can be less than about 6 mm, or less than about 5 mm, or less than about 4 mm, or less than about 3 mm. In one embodiment, the raised structures have a height between about 1 mm and about 5 mm. In another embodiment, the height is between about 2 mm and about 4 mm.

Roll roofing products such as a granule covered bituminous membranes are also contemplated. Bituminous membranes may be self-adhesive and include adhesive on their lower surface to bond the product to a roof substrate. Bituminous membranes may also be adhered using another adhesive or by torching methods known in the art.

Roll roofing products are generally used on lower slope roofs. For example, in residential architecture, it is not uncommon for a lower slope portion of a roof, such as a covering for a porch, to be provided with a granule covered roll roofing product that is complementary in color to the color of the shingles on the main roof of a house. In this type of roofing product, the majority of the upper surface is usually an exposure zone, and a side lap or selvage edge is overlapped at a seam between adjacent rolls of the roofing product as it traverses the roof deck. In such embodiments, the exposure zone may include a highly solar reflective white base and overlays with colored granules to provide raised structures that present a colorful aesthetic to viewers at street level and yet still reflect light and heat upwardly.

In some embodiments, the highly solar reflective granules may comprise, for example, at least one of crushed quartz granules, crushed calcites, ceramic particles, crushed ceramic grog, sintered clay particles, $TiO_2$ particles, infrared reflective pigments, calcined clays, zinc oxide particles, reflective polymer particles, reflective glass spheres, retro-reflective glass beads, reflective mica or thin film coated mica, heat reflective particles, metal flakes, metal particles, metal spheres and colored mineral particles. The reflective particles may further comprise at least one of an algaecide, fungicide, biocide, UV blocking, color, and metallic appearance.

Further regarding coloration of the granules, CIELAB is the second of two systems adopted by CIE in 1976 as models that better showed uniform color spacing in their values. CIELAB is an opponent color system based on the earlier (1942) system of Richard Hunter called L, a, b. Color opposition correlates with discoveries in the mid-1960s that somewhere between the optical nerve and the brain, retinal color stimuli are translated into distinctions between light and dark, red and green, and blue and yellow. CIELAB indicates these values with three axes: L*, a*, and b*. (The full nomenclature is 1976 CIE L*a*b* Space.) The central vertical axis represents lightness (signified as L*) whose values run from 0 (black) to 100 (white). The color axes are based on the fact that a color cannot be both red and green, or both blue and yellow, because these colors oppose each other. On each axis the values run from positive to negative. On the a-a' axis, positive values indicate amounts of red while negative values indicate amounts of green. On the b-b' axis, yellow is positive and blue is negative. For both axes, zero is neutral gray.

For the purposes of this application, articles having a color falling within the inverted conical volume defined by the equation:

$$-(L^*)+[((L_o^*)+(y(a^*)^2+z(b^*)^2)^{0.5})/x] \leq 0$$

where $L_o^*=67$, $x=1.05$, $y=1.0$, $z=1.0$ and the values, L*, a*, and b*, defined on the CIE L*a*b* scale are said to be white, and articles having a color falling outside the cone are said to be non-white.

Values of the color space corresponding to white fall within the cone close to the vertical L* axis, are not strongly colored as indicated by their small displacements along either or both of the a* and b* axes, and have a relatively high degree of lightness as indicated by an L* greater than $L_0^*$. $L_0^*$ is the vertex of the cone.

In one embodiment, the binder, pigment, and ratio of pigment to binder in the roofing granules applied as the base portion of the exposure area of the roofing product are selected such that the solar heat-reflective granules are white in color, and have $(a^{*2}+b^{*2})^{1/2}$ less than 10, or less than 6, or even less than 2.5. Further, the solar heat-reflective granules have an L* of at least 70, at least 75, more at least 80, at least 85, or at least 90. In another embodiment, the raised structure overlay granules are colored and have an L* of less than about 60 percent, less than about 50 percent, less than about 40 percent, or even less than about 30 percent, and have a solar reflectance of greater than about 20 percent, greater than about 30 percent or greater than about 40 percent. In yet another embodiment the colored granules are conventionally colored roofing granules and have lower solar reflectance values. Preferred colored granules include granules such as those described in the following patents: U.S. Pat. No. 7,241,500 and in U.S. Pat. No. 7,919,170, U.S. Pat. No. 7,648,755 and U.S. Pat. No. 7,455,899. Preferred white granules include granules such as those described in published applications WO2011/082398A1, WO2011082374A1, US20110052874A1, and U.S. patent application Ser. No. 13/043,036. Each of these documents is incorporated herein by reference in its entirety.

EXAMPLE

Figure 15:
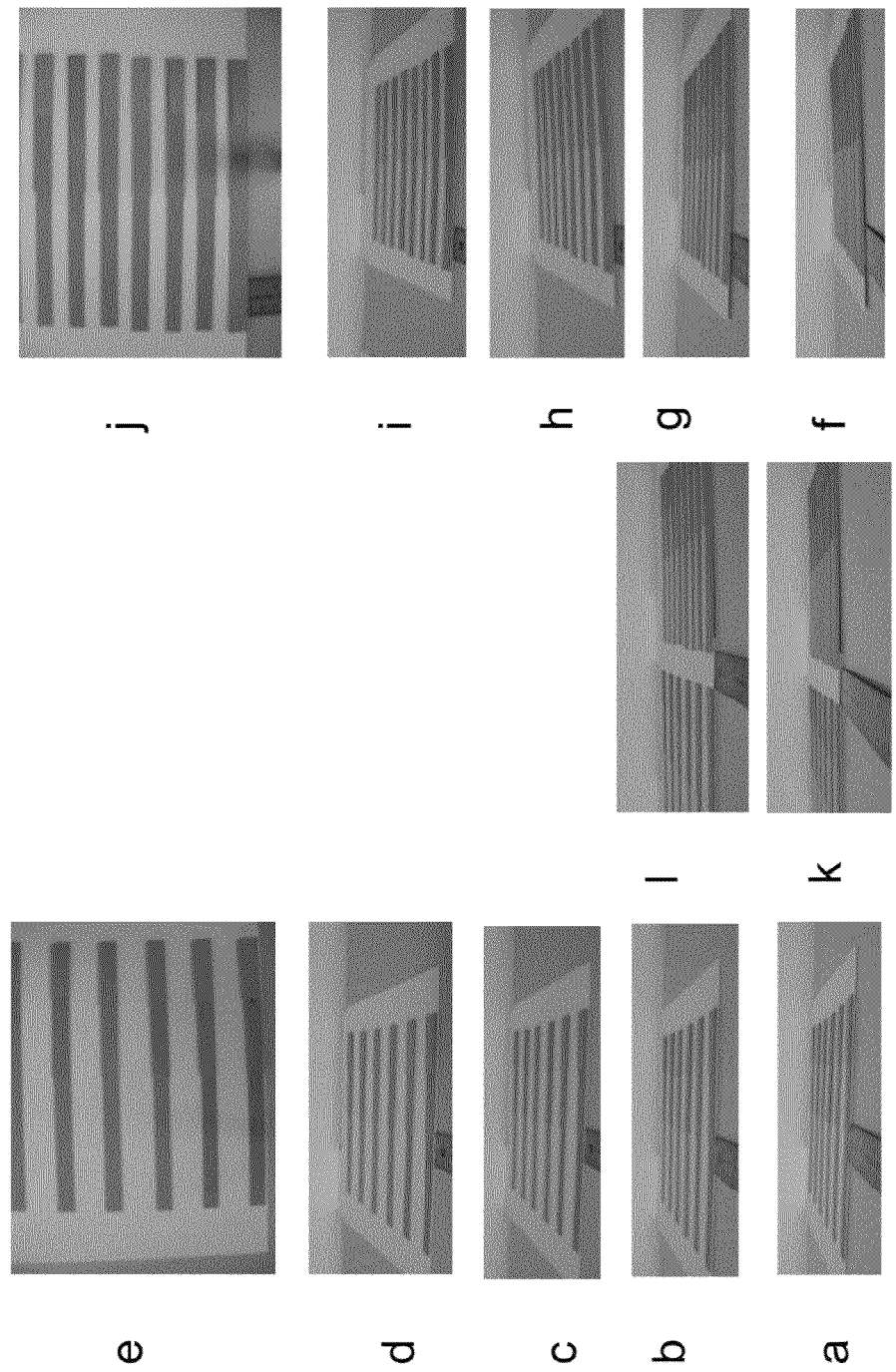
FIG. 15 is a series of photographs of simulated roofing products with raised structures.

As shown in FIG. 15 and explained below, a series of simulated roofing products having a highly reflective base zone and colored overlay zones having raised structures were assembled. Strips of brown cardboard about 0.8 mm in thickness were cut to widths of 0.5 inches and lengths of 8.5 inches. The strips were mounted in an array on a light colored manila folder with the strips spaced 0.5 inches apart on the light surface and attached thereto with adhesive. The array was mounted with a first strip at one edge of the light sheet covering the first half inch of the sheet. A 0.5 inch gap was used to expose the light colored area, and then another strip was applied to make an array of eight such strips each with a 0.5 inch gap between them. A second set of cardboard strips was cut with a length of about 4.25 inches. One of each of the second set of strips was then mounted on top of each of the 8.5 inch strips on the array, with right ends aligned with the right end of the underlying strip to yield an array that had a thickness of one cardboard overlay on the left half of the array, and an overlay thickness of two cardboard strip on the right half of the array. A third set of cardboard strips was cut with each strip having a length of about 2 inches. The third set of strips was attached to the array, one of each of the third set of strips surmounting one of each of the 4.5 inch strips, with right ends aligned with the right ends of the underlying stack of strips, thus yielding an array with overlays having one thickness of cardboard at the left, overlays having a thickness of two layers to the right of center of the array, and overlays having a thickness of three layers of cardboard. The overlay width was the same as the gap between the overlays or overlay stacks. A second array was assembled similarly, except that the spacing between overlays and stacks of overlay was one inch so that the space between overlays was twice the width of the overlay.

The arrays were placed on a flat surface and viewed at low angles near the plane of the arrays (i.e., high angles off-normal). At the grazing angles that would simulate an observer looking up at a roof of a building from ground level, the overlays contributed significantly to the color and appearance of the array. At some angles, the light colored base zone was not visible at all, whereas at a normal angle looking down at the array, it accounted for one half the area of the array in the case of the first simulated prototype array, and two thirds of the area of the array in the case of the second simulated prototype array.

FIG. 15 illustrates the two arrays prepared and viewed as described above. The arrays were placed on a flat surface. The images are shown at a distance of 12 inches from the leading edge of the arrays, and at heights or elevations of 2, 4, 6 and 8 inches above the arrays. Images also depict looking down normal to the array at a distance of 12 inches. In FIGS. 15a, b, c, d, and e, the second array (i.e., wide base zones) appears at elevations of 2, 4, 6, and 8 inches (i.e., at high angles), and normal to the array, respectively. In FIGS. 15f, g, h, i, and j, the corresponding angles for images of the first array (i.e., narrow base zones) appear. FIGS. 15k and l show the same two arrays, side-by-side, at heights of 2 and 4 inches with a 12 inch setback.

The differing thicknesses of the overlays are visible across a given array from left to right. For example, in FIG. 15f and g, at the rightmost edges of the arrays, the colored overlay zones obscure the light reflective zone from view even though the light area makes up 50% of the total surface area, as shown in FIG. 15j. Analogously, in FIG. 15a, the three strip laminated overlays appear to comprise about 70% of the presented area at the 2 inch viewing height. The overlays with a height of about 2.7 mm were able to obscure most of the 1 inch separations between the overlays at an angle of about 80 degrees off normal. These overlays also were able to completely obscure the 0.5 inch separations (FIGS. 15f, g and h) at an angle of about 80 degrees off normal. In addition, these overlays obscured most of the 0.5 inch separations at angles of about 72 degrees and about 65 degrees off normal.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A roofing product, comprising:
   a substrate having an exposure zone and a headlap zone;
   a bitumen layer on the substrate;
   first granules on the bitumen layer in the exposure zone, the first granules having a solar reflectance greater than 35;
   an adhesive on only some portions on tops of the first granules, such that the first granules have an open portion that is free of the adhesive; and
   an overlay of second granules that are non-white in color on the adhesive, such that the overlay of second granules and the adhesive form raised structures that are distributed substantially across the exposure zone above a plane of the first granules.

2. The roofing product of claim 1, wherein the roofing product is planar and flexible.

3. The roofing product of claim 1, wherein the roofing product is a shingle.

4. The roofing product of claim 1, wherein the roofing product is a roll roofing product.

5. The roofing product of claim 1, wherein the raised structures provide a dominant component of a color of the roofing product when viewed from a down roof position at an angle of at least 70° off normal.

6. The roofing product of claim 1, wherein the substrate is a fiberglass web, and the adhesive is an organic polymer or a bituminous adhesive.

7. The roofing product of claim 1, wherein the first granules have a solar reflectance greater than 50.

8. The roofing product of claim 1, wherein the second granules have a solar reflectance greater than about 30.

9. The roofing product of claim 1, wherein the raised structures are continuous.

10. The roofing product of claim 1, wherein at least two of the raised structures intersect.

11. The roofing product of claim 1, wherein the raised structures are discontinuous.

12. The roofing product of claim 1, wherein the raised structures are parallel to one another.

13. The roofing product of claim 1, wherein the raised structures have a wavy shape.

14. The roofing product of claim 1, wherein the raised structures vary in a crossweb position in a downweb direction.

15. The roofing product of claim 1, wherein the raised structures have a shape selected from the group of consisting of circles, ellipsoids, polygons, squares, checks, rectangles, parallelograms, chevrons, triangles, and trapezoids.

16. The roofing product of claim 1, wherein the raised structures vary in shape.

17. The roofing product of claim 1, wherein the raised structures vary in size.

18. The roofing product of claim 1, wherein the raised structures cover less than about 50 percent of the exposure zone.

19. The roofing product of claim 1, wherein the raised structures have a width between about 8 mm and about 40 mm.

20. The roofing product of claim 1, wherein the raised structures have a height between about 1 mm and about 5 mm.

21. The roofing product of claim 1, wherein the raised structures vary in height.

22. A roofing product, comprising:
   a sheet having an exposure portion and a non-exposure portion;
   a coating of an adhesive on the sheet, the adhesive coated sheet having a front surface and a rear surface;
   a front layer of first granules adhered to the front surface of the exposure portion of the sheet comprising a first granule coated front surface, and the first granules have a solar reflectance greater than 50;
   an overlay adhesive coating adhered to at least a first zone on top of the first granule coated front surface of the exposure portion;
   a second zone of the first granule coated front surface of the exposure portion that is free of the overlay adhesive coating; and
   an overlay layer of second granules adhered to the first zone of the overlay adhesive coating such that the overlay layer of the second granules and the overlay adhesive coating comprise a raised structure above a plane of the exposure portion, and the second granules have a non-white color.

23. The roofing product of claim 22, wherein the sheet comprises a material selected from the group consisting of asphalt, metal, plastic and fiberglass or a combination thereof.

24. The roofing product of claim 22, wherein at least one of the adhesive layer or the overlay adhesive coating comprises an organic polymer or a bituminous material.

* * * * *